(No Model.)
J. TRENKLE.
HOOF SPREADER.
No. 557,455. Patented Mar. 31, 1896.
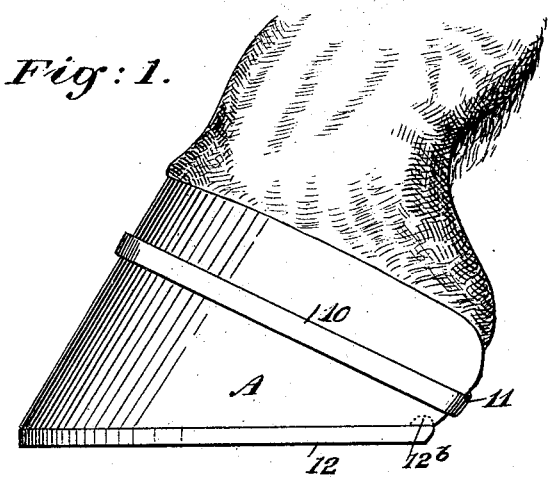
Fig: 1.
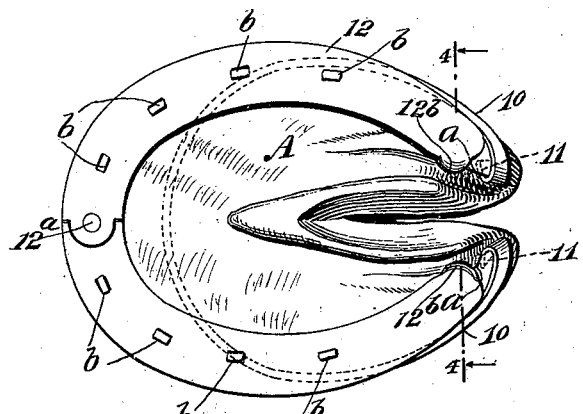
Fig: 2.
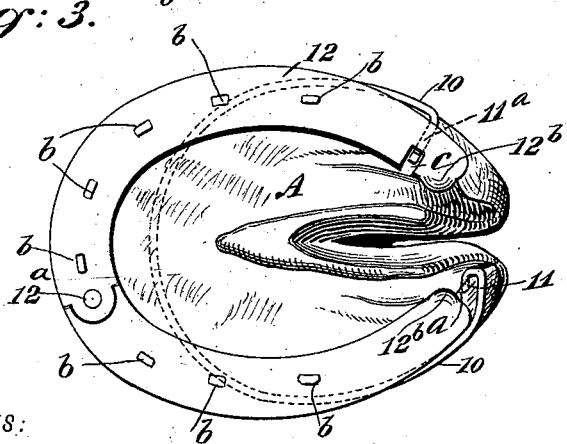
Fig: 3.
Fig: 4.
WITNESSES:
Wm. T. Patton
A. Lurcott.
INVENTOR
J. Trenkle.
BY Munn & Co.
ATTORNEYS.

UNITED STATES PATENT OFFICE.

JACOB TRENKLE, OF PORTVILLE, NEW YORK.

HOOF-SPREADER.

SPECIFICATION forming part of Letters Patent No. 557,455, dated March 31, 1896.

Application filed August 16, 1895. Serial No. 559,538. (No model.)

*To all whom it may concern:*

Be it known that I, JACOB TRENKLE, of Portville, in the county of Cattaraugus and State of New York, have invented certain new and useful Improvements in Hoof-Spreaders, of which the following is a full, clear, and exact description.

This invention relates to an improved device for spreading the hoofs of horses or mules to prevent and cure lameness that frequently results when the hoofs of the animal improperly contract at their heels.

The object of my invention is to provide a simple device of novel construction which may readily be attached to the hoof of a horse, either shod or unshod, and which will be adapted to pull constantly on the heel of the hoof, thereby gradually spreading the hoof to its natural size.

A further object is to produce a hoof-spreader which can be employed to spread both or either side of the same and cure hoof-bound feet or stop the progress of such malformation of the feet of the animal.

To these ends my invention consists in the construction of the device and its method of application to the hoof of an animal, as is hereinafter described, and defined in the claims.

Reference is to be had to the accompanying drawings, forming a part of this specification, in which similar characters of reference indicate corresponding parts in all the figures.

Figure 1 is a partly-sectional side view of the improvement applied to the hoof of an animal. Fig. 2 is a reverse plan view of the shod foot of an animal, showing the improved hoof-spreader applied to draw apart both quarters of the hoof at its heel. Fig. 3 is a reverse plan view of the hoof, a shoe thereon, and a slightly-modified form of the hoof-spreading device engaging the shoe and hoof to spread one side of the hoof at its heel; and Fig. 4 is a transverse sectional view, in part, of an animal's hoof and of the improved hoof-spreader, taken on the line 4 4 in Fig. 2.

It sometimes occurs that from abnormal growth or other causes the hoof or hoofs of a horse injuriously contract, thereby pressing upon the sensitive part of the foot, causing a morbid contraction of its parts, congestion of its vessels, and irritation of its nerves, that consequently give rise to pain and lameness, which, if not relieved, will permanently unfit the animal for service. It has been found that constant draft strain, if moderately applied to the coronary band of the hoof at its rear ends, will tend to gradually effect a divergence of these parts, and thus enable a free circulation and relieve the sensitive part of the foot from the constriction produced by the abnormal contractions of the wall of the hoof.

The improved hoof-spreading device of my invention serves to put moderate draft strain on the heel of the hoof, so as to gradually widen the said heel, and thus afford ample room for the expansion of the sensitive part of the foot, which when effected relieves the animal of pain and restores his feet to a healthy condition.

As shown in Figs. 1 and 2, the improvement consists of a metal yoke-piece 10, having a hook member 11 inwardly bent on each end of the yoke-piece, the latter being bent to conform to the contour of the hoof on which it is to be applied. Preferably the yoke-piece 10 is produced from a strip of elastic steel, which is sufficiently thin to adapt it to bend and conform with the exterior front and quarters of the hoof it is to fit upon, as clearly shown in Figs. 1 and 2. It will be seen that the hook members 11 are made to engage with the rear ends $a$ of the coronary band on the hoof A of the animal's foot, and when in position the yoke-piece inclines upwardly and forwardly, encircling the hoof and fitting closely thereon.

The hoof-spreading device is preferably employed in connection with a light shoe 12, that is formed of two pieces which are jointed together at their forward ends, as indicated at $12^a$ in Figs. 2 and 3, the shoe having hook-shaped lips $12^b$ formed on its rear ends, which lips are made to hook fast upon the coronary band $a$ when the shoe is secured in place on the hoof by nails $b$. It will be seen that the joint of the shoe will permit the yoke-piece 10 to exert a spreading action constantly on the rear portions of the hoof and eventually restore it to normal shape. The lips $12^b$ prevent the nails $b$ from being torn out of the hoof while in use.

In Fig. 3 is shown a slightly-modified construction of the improvement, which is to be used with a shoe 12 on the hoof for spreading one quarter of the hoof. In this construction of the yoke-piece one hook member, 11ª, is bent so that it may engage with a notch *c* in the shoe 12, said notch being near the heel of the shoe in the inner edge of one limb. The other hook member, 11, of the yoke-piece 10 is bent substantially the same as are the hooks on the yoke-piece shown in Fig. 2 and engages its end with the inner edge of the coronary band of the hoof at its end *a*. When the device shown in Fig. 3 is used, it is preferred to place the joint 12$^d$ of the shoe 12 at one side of the toe of the shoe, or nearer to the hook 11 than to the hook 11ª, so as to allow the full force of the expansive-spring yoke-piece 10 to pull outwardly on the hoof, where it is hooked fast to the latter by its hook 11.

Having thus described my invention, I claim as new and desire to secure by Letters Patent—

1. A hoof-spreader, comprising a jointed shoe, an expansible yoke-piece or looped band adapted to encircle the wall of the hoof and having inwardly-bent attaching-hooks on its ends, substantially as described.

2. The combination with a jointed shoe, having a notch in one limb near its heel, of an expansible yoke-piece having hook members adapted to respectively engage the notch in the shoe and one side of the heel of the hoof to which said shoe is applied, substantially as described.

3. The combination with a jointed shoe having hook-shaped lips on the ends of the limbs adapted to engage the heel of the hoof, of an expansible yoke-piece having inwardly-bent hooks on its ends, the bow of the said yoke-piece being adapted to encircle the wall of the hoof, substantially as described.

JACOB TRENKLE.

Witnesses:
BUN SPENCER,
H. L. RICE.